US012728660B2

(12) United States Patent
Belevski et al.

(10) Patent No.: US 12,728,660 B2
(45) Date of Patent: Sep. 8, 2026

(54) BOOK BINDING MISMATCH DETECTION SYSTEM AND METHOD

(71) Applicant: LIGHTNING SOURCE LLC, LaVergne, TN (US)

(72) Inventors: Zoran Belevski, LaVergne, TN (US); Joshua Sanders, LaVergne, TN (US); Danny Howell, LaVergne, TN (US); John Kwiatkowski, LaVergne, TN (US); Kenneth McDonald, LaVergne, TN (US); Joel Brawner, LaVergne, TN (US); Kevin Smith, LaVergne, TN (US)

(73) Assignee: Lightning Source LLC, LaVergne, TN (US)

(*) Notice: Subject to any disclaimer, the term of this patent is extended or adjusted under 35 U.S.C. 154(b) by 219 days.

(21) Appl. No.: 18/670,159

(22) Filed: May 21, 2024

(65) Prior Publication Data

US 2025/0058577 A1 Feb. 20, 2025

Related U.S. Application Data

(60) Provisional application No. 63/532,493, filed on Aug. 14, 2023.

(51) Int. Cl.
*B42C 1/12* (2006.01)
*B42C 11/04* (2006.01)
(Continued)

(52) U.S. Cl.
CPC .............. *B42C 1/125* (2013.01); *B42C 11/04* (2013.01); *B42C 19/02* (2013.01); *B42C 19/08* (2013.01)

(58) Field of Classification Search
CPC ......... B42C 1/125; B42C 11/04; B42C 19/02; B42C 19/08; B42B 2/02
See application file for complete search history.

(56) References Cited

U.S. PATENT DOCUMENTS 3,561,752 A * 2/1971 McCain .................. B42C 19/04 270/56
5,174,454 A 12/1992 Parkander
(Continued)

FOREIGN PATENT DOCUMENTS

CA 2974039 A1 7/2016
EP 2269823 A1 1/2011

OTHER PUBLICATIONS

International Searching Authority's Search Report and Written Opinion of patent application No. PCT/US2024/030316, dated Sep. 11, 2024, 10 pages.

*Primary Examiner* — Michael Collins
(74) *Attorney, Agent, or Firm* — Patterson Intellectual Property Law, PC

(57) ABSTRACT

A mismatch detection system comprising a book block assembly line, a plurality of book block sensors, a case cover assembly line, and an infeed sorter. The book block assembly line may be operable to output conforming book blocks and divert nonconforming book blocks. The plurality of book block sensors may be operable to detect a unique identifier (UID) of the nonconforming book blocks diverted by the book block assembly line. The case cover assembly line may be operable to output case covers. The infeed sorter may be operable to receive the conforming book blocks and the case covers, group one book block and once case cover into a pair, detect whether the conforming book block and case cover of the pair match, divert any of the case covers that do not match, and output a matching pair to a book binding device.

14 Claims, 5 Drawing Sheets

(51) Int. Cl.

| | |
|---|---|
| ***B42C 19/02*** | (2006.01) |
| ***B42C 19/08*** | (2006.01) |

(56) References Cited

U.S. PATENT DOCUMENTS

| | | | | | |
|---|---|---|---|---|---|
| 5,178,506 | A | 1/1993 | Meschi | | |
| 5,419,541 | A * | 5/1995 | Stevens | B65H 39/06 | 270/58.08 |
| 5,857,830 | A | 1/1999 | Harres et al. | | |
| 6,193,458 | B1 | 2/2001 | Marsh | | |
| 7,441,762 | B2 | 10/2008 | Kearns | | |
| 8,425,389 | B2 | 4/2013 | Dobrovolsky | | |
| 9,067,453 | B2 | 6/2015 | Wiegand et al. | | |
| 9,959,017 | B2 | 5/2018 | Mindrum | | |
| 10,246,277 | B1 | 4/2019 | Kubiak et al. | | |
| 10,421,627 | B2 | 9/2019 | Kubiak et al. | | |
| 10,449,796 | B2 | 10/2019 | Dobrovolsky | | |
| 12,319,079 | B1 * | 6/2025 | Belevski | B42C 11/02 | |
| 2006/0028662 | A1 | 2/2006 | Dobrovolsky | | |
| 2006/0225570 | A1 | 10/2006 | Levine et al. | | |
| 2007/0036637 | A1 * | 2/2007 | Hata | B42C 11/02 | 412/9 |
| 2009/0274536 | A1 | 11/2009 | Silberbauer | | |
| 2010/0158639 | A1 | 6/2010 | Manico et al. | | |
| 2011/0280688 | A1 | 11/2011 | Mueller | | |
| 2012/0155701 | A1 | 6/2012 | Levine et al. | | |
| 2012/0268792 | A1 * | 10/2012 | Ozaki | G06F 3/1253 | 358/1.18 |
| 2017/0066273 | A1 * | 3/2017 | Altenbach | B42C 9/0006 | |
| 2017/0129269 | A1 | 5/2017 | Dobrovolsky | | |
| 2017/0239971 | A1 | 8/2017 | Mueller | | |
| 2020/0193337 | A1 * | 6/2020 | Teranishi | H04W 4/02 | |

* cited by examiner

BOOK BINDING MISMATCH DETECTION SYSTEM AND METHOD

CROSS-REFERENCES TO RELATED APPLICATIONS

This application claims benefit of U.S. Provisional Patent Application No. 63/532,493, filed Aug. 14, 2023, and which is hereby incorporated by reference in its entirety.

FIELD OF THE DISCLOSURE

The present disclosure relates generally to the field of processing printed materials, and, more particularly, a mismatch detection system.

BACKGROUND

Processing printed materials, namely manufacturing books, may begin with printing text or other content onto a web or roll of paper material at a printing station. Once the roll of paper material has been printed, the roll of paper may be transferred to a cutting station. At the cutting station, the roll of paper may be cut into individual sheets. In alternative book manufacturing processes, the roll of paper may be cut into individual sheets at the cutting station before being transferred to the printing station where text or other content is printed onto the individual sheets.

The individual sheets may be transferred to a folding station where each individual sheet is folded. The folded sheets may then be transferred to a collection station where the folded sheets are collected and combined into a book block. The book block may then be transferred to a binding station where each of the individual folded sheets of the book block are bound together and a cover is attached, thus creating a bound book. The bound book is then transferred to a trimming station where the bound book may be trimmed to size as needed.

Issues may occur at the binding station where the book blocks are bound to the case covers a book binding device. Namely, mismatching book blocks and case covers may be loaded into the book binding device. An operator may stop the book binding device before the mismatching book block and case cover are bound, or the machine may detect a mismatch and stop running, thus resulting in a productivity loss. Alternatively, the mismatching book block and case cover may be bound, resulting in a defective product going out to the customer or an increase in scrapped product if the error is caught.

Accordingly, a need exists to reduce productivity loss and scrapped product.

BRIEF SUMMARY

This summary is provided to introduce a selection of concepts in a simplified form with respect to those further described below. This summary is not intended to identify key features or essential features of an invention as disclosed herein, or to otherwise limit the scope of an invention as disclosed herein, unless otherwise specifically noted.

In an embodiment as disclosed herein, a method is provided for detecting and automatically correcting book portion mismatches in a book binding operation. Input signals are received from one or more online sensors corresponding to a sequence of first book portions being conveyed along a first assembly channel leading into a book binding stage and corresponding to a sequence of second book portions being conveyed along a second assembly channel leading into the book binding stage, and a mismatch may be determined between a first book portion and a second book portion based on the respective sequences and with respect to expected first and second sequences. In the event of a determined mismatch, control signals are provided to an infeed sorter associated with a book binding portion of the book binding stage, for automatically diverting one or more of the mismatched first book portion and the second book portion, wherein a matching pair of first and second book portions is output to the book binding portion.

In one exemplary aspect according to the above-referenced method embodiment, the mismatch may be determined at least in part by comparing the respective sequences, as determined from the received input signals, to predefined corresponding sequences.

In another exemplary aspect according to the above-referenced method embodiment and optionally other aspects thereof, control signals may be provided to a first quality detection system associated with the first assembly channel and/or a second quality detection system associated with the second assembly channel, and arranged after the respective one or more online sensors, for automatically diverting respective book portions failing a quality inspection based at least in part on the received input signals, wherein the mismatch may be determined at least partially in view of a modified sequence corresponding to the automatically diverted respective book portions.

In another exemplary aspect according to the above-referenced method embodiment and optionally other aspects thereof, the method may include receiving input signals from one or more further online sensors associated with the infeed sorter, wherein the mismatch may be determined at least in part by comparing the respective sequences, as determined from the received input signals from the one or more online sensors prior to the infeed sorter, to the respective sequences as determined from the one or more further online sensors associated with the infeed sorter.

In another exemplary aspect according to the above-referenced method embodiment and optionally other aspects thereof, the method may include providing control signals to the infeed sorter for automatically disabling or suspending a book binding operation of the book binding portion upon determining that a matching pair of first and second book portions cannot be output to the book binding portion within a specified threshold number of diverted book portions.

In another exemplary aspect according to the above-referenced method embodiment and optionally other aspects thereof, the first book portions may comprise book blocks, and the second book portions may comprise covers.

In another exemplary aspect according to the above-referenced method embodiment and optionally other aspects thereof, the one or more online sensors may provide output signals representative of a unique identifier associated with a respective book portion.

In another embodiment as disclosed herein, a system is provided for detecting and automatically correcting book portion mismatches in a book binding operation. The system may include one or more online sensors configured to generate output signals corresponding to a sequence of first book portions being conveyed along a first assembly channel leading into a book binding stage and corresponding to a sequence of second book portions being conveyed along a second assembly channel leading into the book binding stage. A controller is functionally linked to the one or more online sensors and an infeed sorter associated with a book binding portion of the book binding stage, and configured to direct the performance of steps in a method according to the above-referenced embodiment and optionally some or all of the above-referenced aspects thereof.

Numerous objects, features and advantages of a system and method as disclosed herein will be readily apparent to those skilled in the art upon a review of the following description in conjunction with the accompanying drawings.

DETAILED DESCRIPTION

Figure 1:
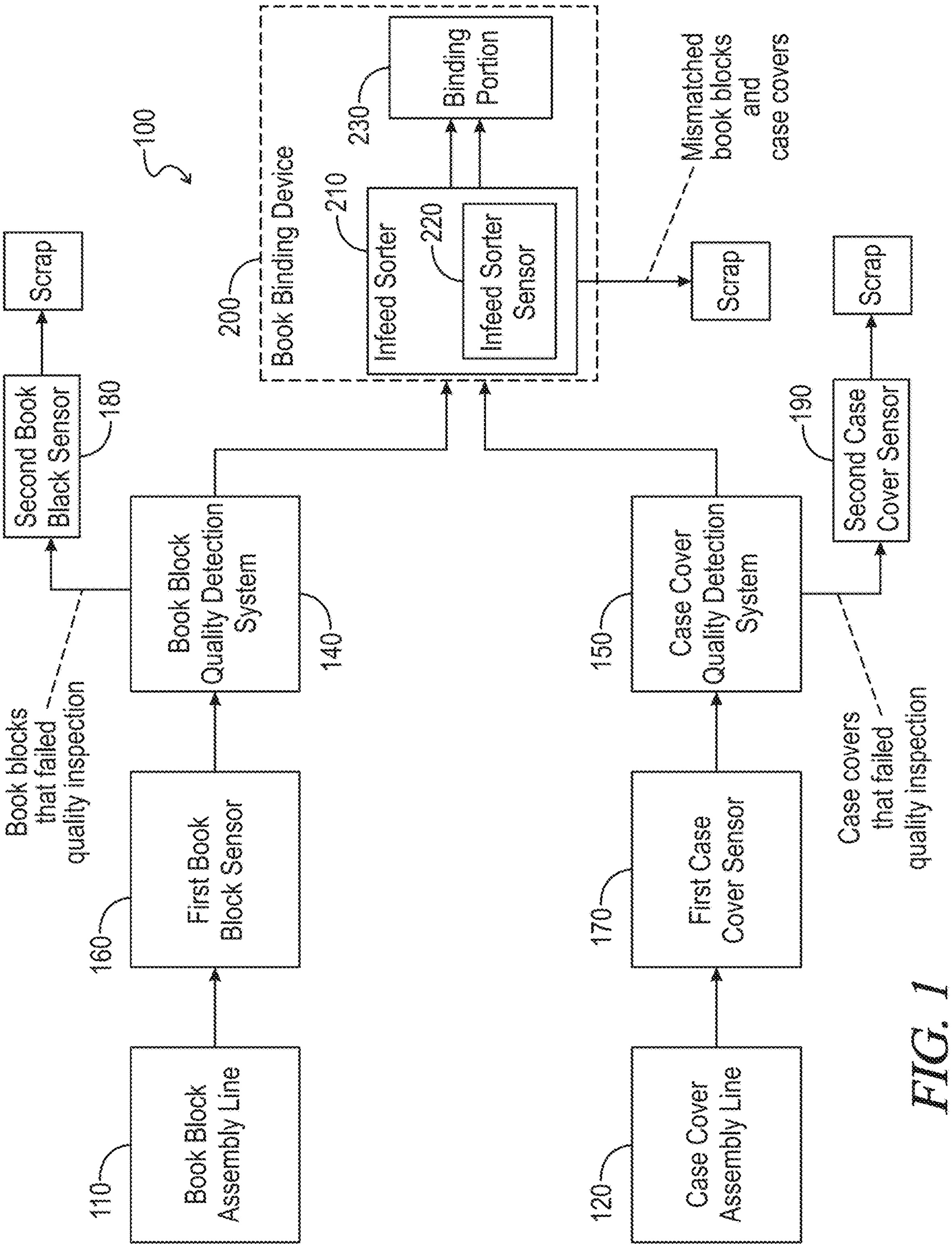
FIG. 1 is a block diagram representing an embodiment of a mismatch detection system according to the present disclosure.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected," "attached," "joined," "mounted," "fastened," and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of an apparatus of the present disclosure may be made of any appropriate or suitable material including, but not limited to, metal, alloy, polymer, polymer mixture, wood, composite, or any combination thereof. Furthermore, any part of an apparatus of the present disclosure may be made using any applicable manufacturing method, such as, but not limited to 3D printing, injection molding, or the like.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Referring now to the figures, and specifically FIG. 1, an embodiment of a mismatch detection system 100 is schematically illustrated. The mismatch detection system 100 may be implemented in connection with a book binding device and associated input assembly lines. In certain optional embodiments, the mismatch detection system 100 may form a portion of such a book binding device and associated assembly lines.

For example, a mismatch detection system 100 according to the present disclosure may include a book block assembly line 110 operable to create and output book blocks 112 and a case cover assembly line 120 operable to create and output case covers 122. A book may be assembled by binding a book block 112 to a corresponding case cover 122. Thus, a book may include a book block 112 bound to a corresponding or matching case cover 122.

The book block assembly line 110 may be synchronized with the case cover assembly line 120. The book block assembly line 110 and the case cover assembly line 120 may be configured to output corresponding book blocks 112 and case covers 122, respectively. For example, in an optional embodiment of the mismatch detection system 100 shown in FIGS. 4 and 5, the book block assembly line 110 may sequentially output book blocks A, B, C, and D. The case cover assembly line 120 may sequentially output case covers A, B, C, and D. Book block A may correspond to case cover A, book block B may correspond to case cover B, book block C may correspond to case cover C, and book block D may correspond to case cover D. Thus, the book blocks 112 may be output from the book block assembly line 110 and the case covers 122 may be output from the case cover assembly line 120 such that the book blocks 112 and case covers 122 constitute a matching pair capable of being bound.

In various embodiments, each book block 112 and case cover 122 may include a unique identifier (UID) 130. The unique identifier may be a Universal Product Code (UPC), International Article Number (EAN), Quick Response (QR) code, or an alphanumerical identifier to name a few examples. Each UID 130 may be printed on, stamped on, or formed in a surface of the book block 112 or case cover 122. The surface the UID 130 appears on may be a surface visible when the book block 112 or case cover 122 is moving through the book manufacturing process, such as a top surface. In some embodiments, an identifier may be defined with reference to a type of book, wherein for example any one of a number of book blocks of a first type may be satisfactorily bound with any one of a number of case covers of a first type. A type of book block or case cover in this context may for example refer to content, graphical designs, shape, size, or the like. In other embodiments, an identifier may be unique to one specific book block to desirably be bound with respect to one specific case cover.

The mismatch detection system 100 may include a book block quality detection system 140. The book block quality detection system 140 may be located after the book block assembly line 110 and operable to receive book blocks 112 output by the book block assembly line 110. In certain optional embodiments, the book block quality detection system 140 may form a portion of the book block assembly line 110. The book block quality detection system 140 may be operable to detect quality errors present in the book blocks 112, such as misprints, incorrect sheet order, or sheet misalignment to name a few examples. In certain optional embodiments, the book block quality detection system 140 may be automatically implemented by a machine. When the book block quality detection system 140 detects an error present in a book block 112, the system may automatically divert the book block 112 from the main assembly line. In other optional embodiments, the book block quality detection system 140 may be implemented by a human operator. Specifically, a human operator may divert the book block 112 from the main assembly line when they detect an error present in a book block 112. Regardless of the method of implementation, the book block quality detection system 140 may be operable to divert or remove book blocks 112 that fail quality inspection from the main assembly line.

The mismatch detection system 100 may, additionally or alternatively with respect to the book block quality detection system 140, include a case cover quality detection system 150. The case cover quality detection system 150 may be located after the case cover assembly line 120 and operable to receive the case covers 122 that are output by the case cover assembly line 120. In certain optional embodiments, the case cover quality detection system 150 may form a portion of the case cover assembly line 120. The case cover quality detection system 150 may be operable to detect quality errors present in case covers 122, such as misprints to name an example. In certain optional embodiments, the case cover quality detection system 150 may be automatically implemented by a machine. When the case cover quality detection system 150 detects an error present in a case cover 122, the system may automatically divert the case cover 122 from the main assembly line. In other optional embodiments, the case cover quality detection system 150 may be implemented by a human operator. Specifically, a human operator may divert the case cover 122 from the main assembly line when they detect an error present in a case cover 122. Regardless of the method of implementation, the case cover quality detection system 150 is operable to divert or remove case covers 122 that fail quality inspection from the main assembly line.

The mismatch detection system 100 may include a controller 310, such as a programmable logic controller (PLC) to name an example, for implementation of some or all automated functions associated with the book block quality detection system 140, the case cover quality detection system 150, and/or other sub-systems as may be later described herein or readily understood by one of skill in the art to be preferably implemented in association therewith.

Figure 2:
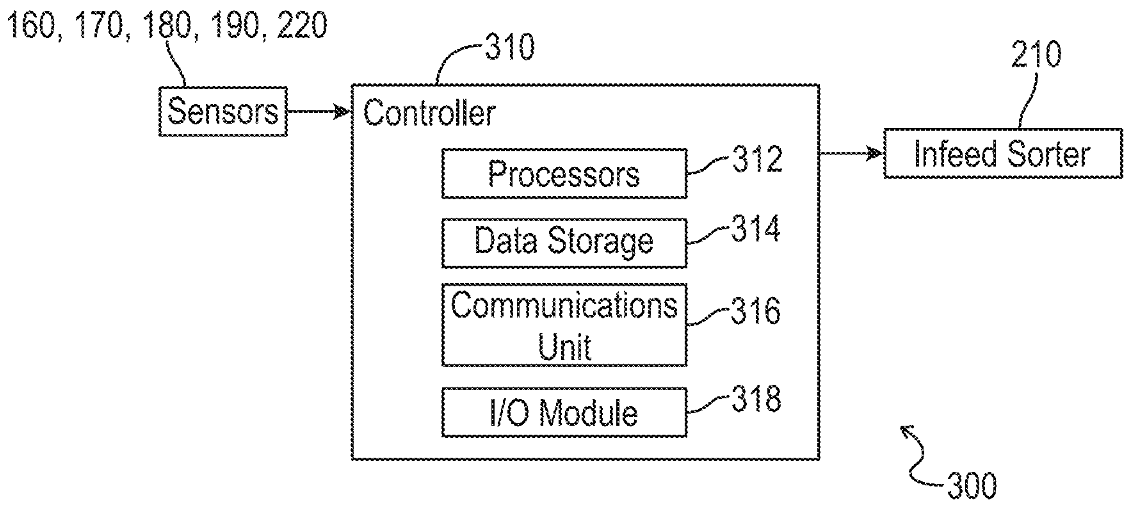
FIG. 2 is a block diagram representing an exemplary control system which may be associated with the mismatch detection system of FIG. 1.

In an embodiment as represented in FIG. 2, the controller 310 may be part of a control system 300, which may be part of a book binding machine control system of a book binding machine 200, or it may be a separate control module. The controller 310 may be configured to receive input signals from one or more sensors defining a sensor system 160, 170, 180, 190, 220 as further described herein. Various of the sensors 160, 170, 180, 190, 220 may typically be discrete in nature, but in some embodiments signals representative of more than one input parameter may be provided from the same sensor, and a sensor system 160, 170, 180, 190, 220 as disclosed herein may further include or otherwise refer to signals provided from the controller 310, an electronic control unit, a book binding machine control system, or the like.

In turn, the controller 310 may have integrated therein or otherwise generate control signals for any or all of a book block quality detection system 140, case cover quality detection system 150, infeed sorter 210, and/or any other component or sub-system that is/are consistent with a mismatch detection system 100 and method 400 as further described below. For example, control signals may comprise signals to one or more actuators for enabling or disabling portions of the binding process, selectively diverting or removing mismatched elements, or the like.

The controller 310 may for example include or be associated with one or more processors 312, a computer readable storage medium 314, a communication unit 316, and the like. The controller 310 may be configured to produce outputs to or receive inputs from, as further described below, an input/output module 318 or an equivalent such as a control panel having a display. An input/output device, such as a keyboard, joystick, or other user interface, may be provided so that a human operator may input instructions to the controller 310. Although not specifically represented in the figures, the controller 310 in accordance with the present disclosure unless otherwise stated may be configured additionally or in the alternative to produce outputs to a display unit independent of the input/output module 318 such as for example a mobile user device associated with the operator, a display unit functionally linked to one or more remote servers, one or more other book binding machines, etc. The controller 310 may in some embodiments further receive inputs from the remote user devices, servers, and/or other book binding machines via respective user interfaces, for example a display unit with touchscreen interface.

It may be understood that the controller 310 described herein may be a single controller having all of the described functionality, such as for example being part of a central book binding machine control unit, or it may include multiple controllers wherein the described functionality is distributed among the multiple controllers.

Various operations, steps or algorithms as described in connection with the controller 310 can be embodied directly in hardware, in a computer program product such as a software module executed by the processor 312, or in a combination of the two. The computer program product can reside in RAM memory, flash memory, ROM memory, EPROM memory, EEPROM memory, registers, hard disk, a removable disk, or any other form of computer-readable medium 314 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 312 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 316 may support or provide communications between the controller 310 and external systems or devices, and/or support or provide communication interface with respect to internal components of the mismatch detection system 100. The communication unit 316 may for example include a transceiver operable to send and receive respective output and input signals, and which may permit communications across a communication medium using known communications protocols or proprietary communication protocols. For example, the transceiver may permit the use of Ethernet, Bluetooth, Wi-Fi, a wireless application protocol, an IEEE 802 standard, or any other communications protocol, configuration, or implementation. The communications unit 316 may include wireless communication system components (e.g., via cellular modem, WiFi, Bluetooth, or the like) and/or may include one or more wired communications terminals such as universal serial bus ports.

It may be understood by one of skill in the art that, unless otherwise stated, the controller 310 described herein may be a single controller having all of the described functionality, or it may include multiple controllers wherein the described functionality is distributed among multiple controllers. Moreover, the controller 310 may be integrated within a book assembly line control system, or an altogether separate unit.

Figure 3:
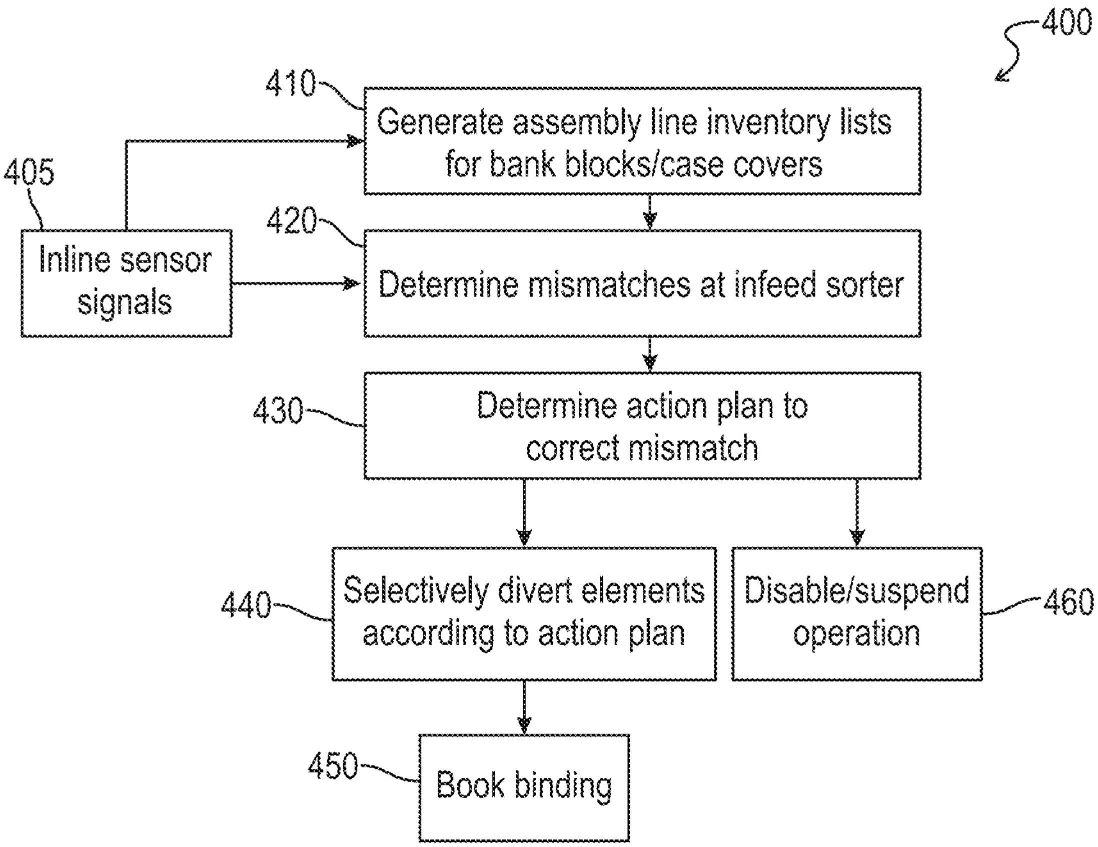
FIG. 3 is a flowchart representing an exemplary embodiment of a mismatch detection method according to the present disclosure.

With further reference now to FIG. 3, the depicted flowchart represents an exemplary embodiment of a method 400 which may for example be executed at least in part by the control system 300 to enable automated control of the mismatch detection system 100. For illustrative purposes, but not limiting on the scope of the systems and methods disclosed herein unless otherwise specifically noted, FIG. 3 will accordingly be described in the context of the systems and associated devices and apparatus of FIGS. 1 and 2. While the illustrated embodiment of a method 400 may include a specific arrangement of steps, inputs, outputs, and the like, it may be understood that certain steps may be combined, performed in a different order, or even omitted altogether in other embodiments within the scope of the present disclosure, unless otherwise specifically noted herein.

The illustrated method 400 may include a step 405 of receiving, processing, and in some cases storing or otherwise utilizing for subsequent retrieval and/or model development or training, signals from one or more online sensors associated with the mismatch detection system 100.

For example, the mismatch detection system 100 may include a first book block sensor 160 operable to read the UID 130 of a book block 112 passing below. The first book block sensor 160 may be positioned between the book block assembly line 110 and the book block quality detection system 140. The first book block sensor 160 may be an optical sensor with a pen-type reader, an optical sensor with a laser scanner, an optical sensor with a charge-couple reader, an optical sensor with a camera-based reader, or the like. Thus, the first book block sensor 160 may read the UID 130 of each book block 112 passing below before the book block 112 is fed into the book block quality detection system 140. The first book block sensor 160 may output a control signal representing the UID 130 of an individual book block 112.

The mismatch detection system 100 may further, or alternatively with respect to the first book block sensor 160, include a first case cover sensor 170 operable to read the UID 130 of a case covers 122 passing below. The first case cover sensor 170 may be positioned between the case cover assembly line 120 and the case cover quality detection system 150. The first case cover sensor 170 may be an optical sensor with a pen-type reader, an optical sensor with a laser scanner, an optical sensor with a charge-couple reader, an optical sensor with a camera-based reader, or the like. Thus, the first case cover sensor 170 may read the UID 130 of each case cover 122 before the case cover 122 is fed into the case cover quality detection system 150. The first case cover sensor 170 may output a control signal representing the UID 130 of an individual case cover 122.

The controller 310 may receive the signals output by the first book block sensor 160 representative of the book block 112 UIDs 130 and the signals output by the first case cover sensor 170 representative of the case cover 122 UIDs 130. The controller 310 may compile each UID 130 received into one or more inventory lists (step 410). In certain optional embodiments, the controller 310 may compile separate inventory lists for book block 112 UIDs 130 and case cover 122 UIDs 130. For example, in an optional embodiment of the mismatch detection system 100 shown in FIGS. 4 and 5, the inventory list after the book blocks 112 have passed the first book block sensor 160 and the case covers 122 have passed the first case cover sensor 170 may include: book blocks A, B, C, and D; and case covers A, B, C, and D.

The embodiment of a method 400 as represented in FIG. 3 further includes steps for determining mismatches (step 420) between detected or expected corresponding book blocks and case covers at an infeed sorter, and determining an action plan (step 430) to correct or otherwise respond to determined mismatches. One example of such an action plan may include selectively diverting one or more mismatched elements (step 440) wherein the book binding operation continues (step 450) with a corrected and now matching set of corresponding book blocks and case covers. Another example of such an action plan may include disabling or suspending the book binding operation (step 460) for manual review and/or correction of the mismatched book blocks and case covers.

In implementing one or more of the above-referenced steps, the mismatch detection system 100 may include a second book block sensor 180 operable to read the UID 130 of a book block 112 passing below. The second book block sensor 180 may be positioned to read the UIDs 130 of book blocks 112 diverted or removed from the main book assembly line by the book block quality detection system 140. The second book block sensor 180 may be an optical sensor with a pen-type reader, an optical sensor with a laser scanner, an optical sensor with a charge-couple reader, an optical sensor with a camera-based reader, or the like. Thus, the second book block sensor 180 may read the UID 130 of each book block 112 after the book block 112 has failed the quality inspection performed by the book block quality detection system 140. The second book block sensor 180 may output a control signal representing the UID 130 of an individual book block 112.

The mismatch detection system 100 may include a second case cover sensor 190 operable to read the UID 130 of a case cover 122 passing below. The second case cover sensor 190 may be positioned to read the UIDs 130 of case covers 122 diverted or removed from the main book assembly line by the case cover quality detection system 150. The second case cover sensor 190 may be an optical sensor with a pen-type reader, an optical sensor with a laser scanner, an optical sensor with a charge-couple reader, an optical sensor with a camera-based reader, or the like. Thus, the second case cover sensor 190 may read the UID 130 of each case cover 122 after the case cover 122 has failed the quality inspection performed by the case cover quality detection system 150. The second case cover sensor 190 may output a control signal representing the UID 130 of each case cover 122.

The controller 310 may receive the signals output by the second book block sensor 180 representative of the book block 112 UIDs 130 and the signals output by the second case cover sensor 190 representative of the case cover 122 UIDs 130. The controller 310 may remove the UIDs 130 read by the second book block sensor 180 and the second case cover sensor 190 from the inventory list. In other words, the controller 310 may remove the UIDs 130 of any book block 112 and/or case cover 122 that has failed quality inspection from the inventory list. For example, in an optional embodiment of the mismatch detection system 100 shown in FIG. 4, the inventory list after the book blocks 112 have passed the second book block sensor 180 and the case covers 122 have passed the second case cover sensor 190 may include: book blocks A, C, and D; and case covers A, B, C, and D. In an optional embodiment of the mismatch detection system 100 shown in FIG. 5, the inventory list after the book blocks 112 have passed the second book block sensor 180 and the case covers 122 have passed the second case cover sensor 190 may include: book blocks A, B, C, and D; and case covers A, B, and D.

The mismatch detection system 100 may include a book binding device 200 positioned after the book block quality detection system 140 and the case cover quality detection system 150. Book blocks 112 output by the book block quality detection system 140 and case covers 122 output by the case cover quality detection system 150 may be transferred into the book binding device 200. Specifically, the book blocks 112 and case covers 122 may be transferred to an infeed sorter 210 (shown in FIG. 3) of the book binding device 200. The infeed sorter 210 may be operable to sort the book blocks 112 and case covers 122 before outputting the book blocks 112 and case covers 122 into a binding portion 230 of the book binding device 200. The infeed sorter 210 may be operable to divert book blocks 112 and case cover 122 that make up mismatched pairs.

The infeed sorter 210 may contain a conveyor portion 212 operable to move and sort articles, namely book blocks 112 and case covers 122. The conveyor portion 212 may position articles in first and second rows. The first and second rows may extend generally parallel to one another. In certain optional embodiments, the first row may include book blocks 112 and the second row may include case covers 122. Each book block 112 received on the first row of the conveyor portion 212 may be aligned with a case cover 122 received on the second row of the conveyor portion 212. Thus, the conveyor portion 212 may align the book blocks 112 and case covers 122 such that a pair is formed, the pair including a single book block 112 and a single case cover 122. The conveyor portion 212 may sequentially feed the pairs of book blocks 112 and case covers 122 into the binding portion 230 one pair at a time.

The controller 310 may be communicatively connected to the infeed sorter 210 and may send control signals thereto. The controller 310 may send control signals to the infeed sorter 210 when a book block 112 and case cover 122 mismatch is present. A mismatch may occur when either a book block 112 or case cover 122 fails quality inspection and is removed from the book assembly line.

Figure 4:
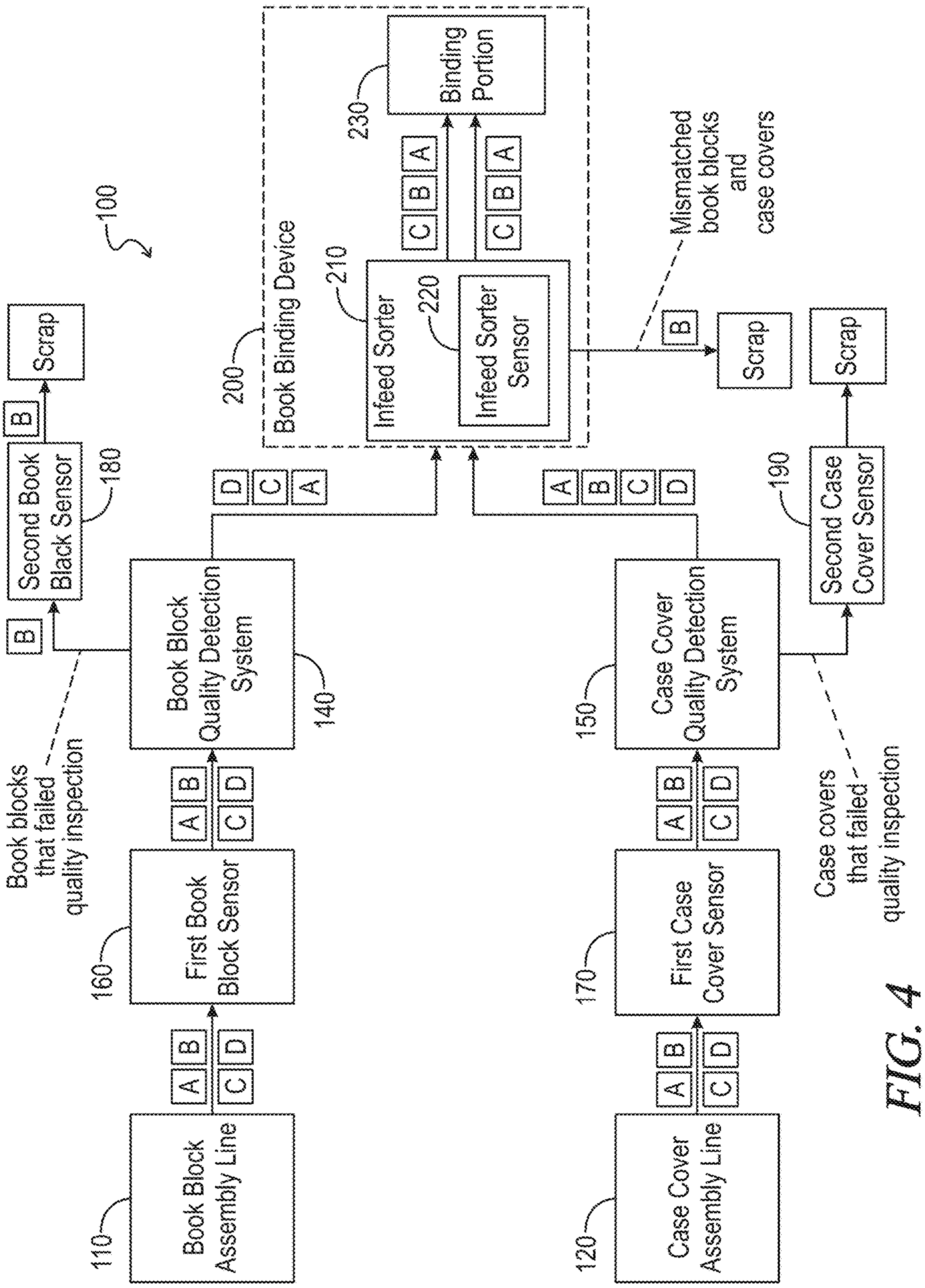
FIG. 4 is a block diagram further representing the mismatch detection system of FIG. 1, according to an exemplary operation thereof.

For example, in an optional embodiment of the mismatch detection system 100 shown in FIG. 4, an inventory list may contain book blocks A, B, C, and D; and case covers A, B, C, and D. Book block B may fail quality inspection and thus the UID 130 of book block B may be read by the second book block sensor 180. Thus, the controller 310 may remove book block B from the inventory list. The inventory list then may only contain: book blocks A, C, and D; and case covers A, B, C, and D. The controller 310 may recognize that the first pair on the conveyor portion 212 of the infeed sorter 210 includes book block A and case cover A and thus are matching. The second pair on the conveyor portion 212 of the infeed sorter 210 may include book block C and case cover B. The controller 310 may recognize that this pair constitutes a mismatch. Here, the mismatch may be due to book block B failing quality inspection and being removed from the book assembly line. The controller 310 may recognize the mismatch has occurred based on a review of the inventory list. The controller 310 may communicate with the infeed sorter 210 indicating the mismatch.

Figure 5:
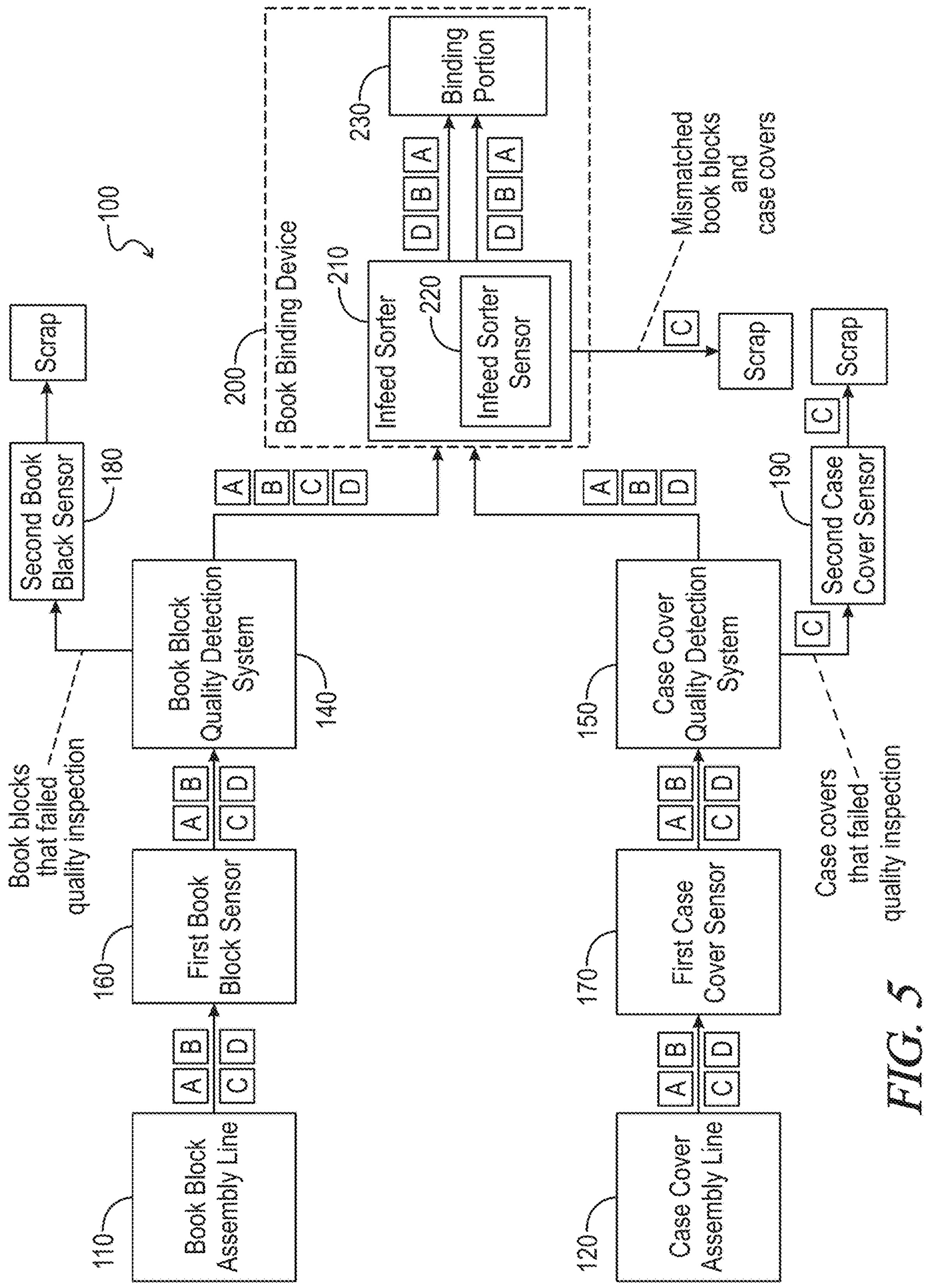
FIG. 5 is a block diagram further representing the mismatch detection system of FIG. 1, according to an exemplary operation thereof.
Figure 6:
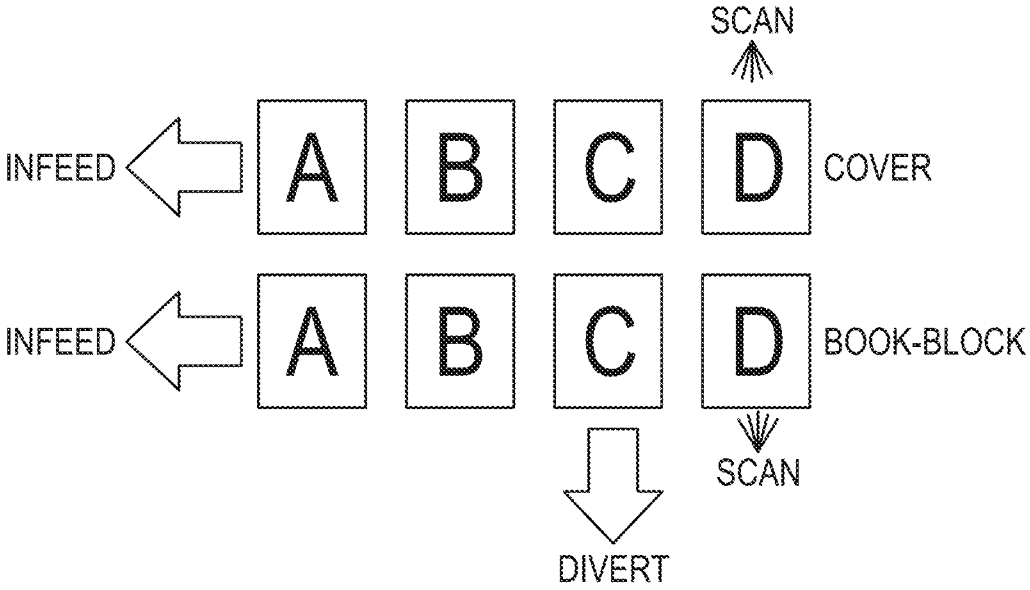
FIG. 6 is a block diagram representing the infeed sorter of the mismatch detection system and an exemplary operation thereof in accordance with exemplary embodiments as disclosed herein.

In an optional embodiment of the mismatch detection system 100 shown in FIG. 5, an inventory list may contain book blocks A, B, C, and D; and case covers A, B, C, and D. Case cover C may fail quality inspection and thus the UID 130 of case cover C may be read by the second case cover sensor 190. Thus, the controller 310 may remove case cover C from the inventory list. The inventory list then may only contain: book blocks A, B, C, and D; and case covers A, B, and D. The controller 310 may recognize that the first pair on the conveyor portion 212 of the infeed sorter 210 includes book block A and case cover A and thus are matching. The controller 310 may recognize that the second pair on the conveyor portion 212 of the infeed sorter 210 includes book block B and case cover B and thus are matching. The third pair on the conveyor portion 212 of the infeed sorter 210 may include book block C and case cover D. The controller 310 may recognize that this pair constitutes a mismatch. Here, the mismatch may be due to case cover C failing quality inspection and being removed from the book assembly line. The controller 310 may recognize the mismatch has occurred based on a review of the inventory list. The controller 310 may communicate with the infeed sorter 210 indicating the mismatch.

The infeed sorter 210 may include an infeed sorter sensor 220 operable to read the UIDs 130 of book blocks 112 and case covers 122 located on the conveyor portion 212 of the infeed sorter 210. The infeed sorter sensor 220 may be an optical sensor with a pen-type reader, an optical sensor with a laser scanner, an optical sensor with a charge-couple reader, an optical sensor with a camera-based reader, or the like. Thus, the infeed sorter sensor 220 may read the UID 130 of each pair that includes a single book block 112 and a single case cover 122. In certain optional embodiments, the infeed sorter sensor 220 may include a plurality of infeed sorter sensors 220. For example, a first infeed sorter sensor 220A may read the UIDs 130 of book blocks 112 and a second infeed sorter sensor 220B may read the UIDs 130 of case covers 122. The infeed sorter sensor 220 may output a control signal representing the UIDs 130 of each book block 112 and case cover 122 included in each pair.

The infeed sorter 210 may remove the book block 112 or case cover 122 causing the mismatch from the conveyor portion 212 of the infeed sorter 210. The infeed sorter 210 may act in response to a control signal from the controller 310 or a control signal from the infeed sorter sensor 220. Thus, the mismatch detection system 100 may function without the infeed sorter sensor 220. The infeed sorter sensor 220 may be a redundant quality measure. If a book block 112 is removed, the conveyor portion 212 may move the next book block 112 in line forward to take the place of the removed book block 112. If a case cover 122 is removed, the conveyor portion 212 may move the next case cover 122 in line forward to take the place of the removed case cover 122. If the mismatch is corrected, the infeed sorter 210 may transfer the matched pair to the binding portion 230 of the book binding device 200. If the mismatch is not corrected, the infeed sorter 210 may divert the book block 112 or case cover 122 causing the mismatch.

In use, book blocks 112 are output from the book block assembly line 110. The UIDs 130 of the book blocks 112 are read by the first book block sensor 160. The controller 310 creates an inventory list of the book block 112 UIDs 130. The book blocks 112 are input into the book block quality detection system 140. Book blocks 112 that fail quality inspection are diverted and the UIDs 130 of the diverted book blocks 112 are read by the second book block sensor 180. The controller 310 removes the UIDs 130 of the diverted book blocks 112 from the inventory list.

The case covers 122 are output from the case cover assembly line 120. The UIDs 130 of the case covers 122 are read by the first case cover sensor 170. The controller 310 creates an inventory list of the case cover 122 UIDs 130. The case covers 122 are input into the case cover quality detection system 150. Case covers 122 that fail quality inspection are diverted and the UIDs 130 of the diverted case covers 122 are read by the second case cover sensor 190. The controller 310 removes the UIDs 130 of the diverted case covers 122 from the inventory list.

The book blocks 112 that passed quality inspection are transferred to the infeed sorter 210. The case covers 122 that passed quality inspection are transferred to the infeed sorter 210. The infeed sorter 210 may divert a book block 112 or case cover 122 if it is included in a mismatched pair. In certain optional embodiments including the infeed sorter sensor 220, the infeed sorter sensor 220 may read the UIDs 130 of the pairs of book blocks 112 and case covers 122 on the conveyor portion 212 of the infeed sorter 210. The infeed sorter 210 may divert a book block 112 or case cover 122 if it is included in a mismatched pair as detected by the infeed sorter sensor 220. The infeed sorter 210 may then transfer matching pairs of book blocks 112 and case covers 122 to the binding portion 230 of the book binding device 200.

Accordingly, one exemplary advantage as provided over conventional book binding operations according to the present disclosure may be a mismatch detection system 100 including hardware and software logic designed to detect the occurrence of a book block 112 being lost in the printing or finishing process. The mismatch detection system 100 may generate an accurate inventory list of book blocks 112 printed successfully in order to generate an accurate cover printing order. Networking cables and software logic may be used for data acquisition, inventory list construction, and generation of an accurate case cover order. The infeed sorter 210 may pre-read the UIDs 130 of book blocks 112 and case covers 122 as they are fed into the book binding device 200, and to detect and divert any case covers 122 that do not match. The infeed sorter 210 may serve as a redundant quality measure.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method for detecting and automatically correcting book portion mismatches in a book binding operation, the method comprising:

receiving input signals from one or more online sensors corresponding to a sequence of first book portions being conveyed along a first assembly channel leading into a book binding stage and from a further one or more online sensors corresponding to a sequence of second book portions being conveyed along a second assembly channel leading into the book binding stage;

determining a mismatch between a first book portion and a second book portion based on the respective sequences and with respect to expected first and second sequences; and providing control signals to an infeed sorter associated with a book binding portion of the book binding stage, for automatically and selectively diverting either or both of the mismatched first book portion and the second book portion depending on a determined cause of the determined mismatch, wherein a matching pair of first and second book portions is output to the book binding portion.

2. The method of claim 1, wherein the mismatch is determined at least in part by comparing the respective sequences, as determined from the received input signals, to predefined corresponding sequences.

3. The method of claim 2, comprising providing control signals to a first quality detection system associated with the first assembly channel and/or a second quality detection system associated with the second assembly channel, and arranged after the respective one or more online sensors, for automatically diverting respective book portions failing a quality inspection based at least in part on the received input signals, wherein the mismatch is determined at least partially in view of a modified sequence corresponding to the automatically diverted respective book portions failing the quality inspection.

4. The method of claim 1, further comprising receiving input signals from one or more further online sensors associated with the infeed sorter, and wherein the mismatch is determined at least in part by comparing the respective sequences, as determined from the received input signals from the one or more online sensors prior to the infeed sorter, to the respective sequences as determined from the one or more further online sensors associated with the infeed sorter.

5. The method of claim 1, comprising providing control signals to the infeed sorter for automatically disabling or suspending a book binding operation of the book binding portion upon determining that a matching pair of first and second book portions cannot be output to the book binding portion within a specified threshold number of diverted book portions.

6. The method of claim 1, wherein the first book portions comprise book blocks, and the second book portions comprise covers.

7. The method of claim 1, wherein the one or more online sensors provide output signals representative of a unique identifier associated with a respective book portion.

8. A system for detecting and automatically correcting book portion mismatches in a book binding operation, the system comprising:

one or more online sensors configured to generate output signals corresponding to a sequence of first book portions being conveyed along a first assembly channel leading into a book binding stage;

a further or more online sensors configured to generate output signals corresponding to a sequence of second book portions being conveyed along a second assembly channel leading into the book binding stage; and a controller functionally linked to the one or more online sensors and an infeed sorter associated with a book binding portion of the book binding stage, and configured to:

determine a mismatch between a first book portion and a second book portion based on the respective sequences and with respect to expected first and second sequences; and provide control signals to the infeed sorter for automatically and selectively diverting either or both of the mismatched first book portion and the second book portion depending on a determined cause of the determined mismatch, wherein a matching pair of first and second book portions is output to the book binding portion.

9. The system of claim 8, wherein the mismatch is determined at least in part by comparing the respective sequences, as determined from the received input signals, to predefined corresponding sequences.

10. The system of claim 9, further comprising:

a first quality detection system associated with the first assembly channel and arranged after the respective one or more sensors;

a second quality detection system associated with the second assembly channel and arranged after the respective one or more sensors;

wherein the controller is further configured to provide control signals to the first quality detection system and/or the second quality detection system, for automatically diverting respective book portions failing a quality inspection based at least in part on the received input signals, wherein the mismatch is determined at least partially in view of a modified sequence corresponding to the automatically diverted respective book portions failing the quality inspection.

11. The system of claim 8, further comprising one or more further online sensors associated with the infeed sorter and functionally linked to the controller, wherein the mismatch is determined at least in part by comparing the respective sequences, as determined from input signals received from the one or more online sensors prior to the infeed sorter, to the respective sequences as determined from the one or more further online sensors associated with the infeed sorter.

12. The system of claim 8, wherein the controller is configured to provide control signals to the infeed sorter for automatically disabling or suspending a book binding operation of the book binding portion upon determining that a matching pair of first and second book portions cannot be output to the book binding portion within a specified threshold number of diverted book portions.

13. The system of claim 8, wherein the first book portions comprise book blocks, and the second book portions comprise covers.

14. The system of claim 8, wherein the one or more online sensors are configured to provide output signals representative of a unique identifier associated with a respective book portion.

* * * * *